US007273573B2

(12) United States Patent
Racunas, Jr.

(10) Patent No.: US 7,273,573 B2
(45) Date of Patent: Sep. 25, 2007

(54) SAND SCULPTURE MOLD

(76) Inventor: Robert Vincent Racunas, Jr., 117 Forestwood Dr., Venetia, PA (US) 15367

( * ) Notice: Subject to any disclaimer, the term of this patent is extended or adjusted under 35 U.S.C. 154(b) by 285 days.

(21) Appl. No.: 10/842,722

(22) Filed: May 10, 2004

(65) Prior Publication Data

US 2005/0249835 A1 Nov. 10, 2005

(51) Int. Cl.
*B29C 33/48* (2006.01)

(52) U.S. Cl. ...................... 264/109; 249/160; 249/119; 425/DIG. 57

(58) Field of Classification Search ................ 249/119, 249/160; 425/DIG. 70, DIG. 57; 446/70; 264/109; 220/8, 752

See application file for complete search history.

(56) References Cited

U.S. PATENT DOCUMENTS 572,509 A * 12/1896 Wilson ........................ 249/144
1,115,334 A * 10/1914 Penick ........................ 220/758
1,248,532 A 12/1917 Noyse
1,610,121 A 12/1926 Dickinson
1,639,934 A * 8/1927 Ferring ........................ 249/165
3,691,672 A 9/1972 Pendill
3,956,437 A 5/1976 Ellis
4,040,460 A * 8/1977 Thornton ........................ 220/8
4,246,953 A 1/1981 Johnson
5,460,561 A 10/1995 Dahlgren
5,895,304 A 4/1999 Dixon
6,126,876 A 10/2000 Demarzo

FOREIGN PATENT DOCUMENTS

CA 2247661 A1 * 10/1998
DE 25 43 565 A1 * 7/1977
GB 180518 6/1922
GB 187412 10/1922

OTHER PUBLICATIONS

English Abstract for DE 25 43 565.*
English Abstract for DE 25 43 565, the reference dated Jul. 1977.*
Long, M., The Can You Dig It Bucket & Form Set, p. 1-3, available at http://www.sandtools.com (accessed on May 11, 2004).
Lee, A., Beachworks The Sand Castle System, p. 1, available at http://www.beautifulmindworks.com/application.htm (accessed May 24, 2004).

* cited by examiner

*Primary Examiner*—Robert B. Davis

(57) ABSTRACT

A sand sculpture mold includes a hollow receptacle that tapers from a first end to a second end. The first end has a rim defining a first opening in the receptacle. The second end has an edge defining a second opening in the receptacle. The mold includes a removable cover structured and arranged to selectively expose and form a substantially water-tight seal in the second end.

24 Claims, 16 Drawing Sheets

SAND SCULPTURE MOLD

BACKGROUND

The present invention relates generally to a sand sculpture mold.

Building a sand sculpture, such as a sand castle, is a popular activity that can be enjoyed by children and adults at a beach or in a backyard sandbox. A sand sculpture can be made from sand and water and shaped with conventional tools such as a pail and shovel.

There exits a need for an improved sand sculpture mold.

SUMMARY

In one general aspect, a sand sculpture mold includes a hollow receptacle that tapers from a first end to a second end. The first end has a rim defining a first opening in the receptacle. The second end has an edge defining a second opening in the receptacle. The mold includes a removable cover structured and arranged to selectively expose and form a substantially water-tight seal in the second end.

Other apparatuses and systems according to embodiments of the present invention will be or become apparent to one with skill in the art upon examination of the following drawings and detailed description. It is intended that all such additional apparatuses and systems be included within this description, be within the scope of the present invention, and be protected by the accompanying claims.

DETAILED DESCRIPTION

It is to be understood that the figures and descriptions of the various embodiments of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Referring now to the several drawings in which like elements are numbered identically throughout, a description of this invention now will be provided, in which exemplary embodiments are shown in the several figures. This invention may be embodied in many different forms and should not be construed as being limited to the embodiments set forth herein. Rather, these embodiments are provided so that this disclosure will be thorough and complete, and will fully convey the scope of the invention to those having ordinary skill in the art. Furthermore, all statements herein reciting embodiments of the invention, as well as specific examples thereof, are intended to encompass both structural and functional equivalents thereof. Moreover, it is intended that such equivalents include both currently known equivalents as well as equivalents developed in the future for performing the same function, regardless of structure. Thus, those skilled in the art will appreciate that the schematic drawings presented herein and the like, represent conceptual views of illustrative structures which may embody the various aspects of this invention.

Figure 1:
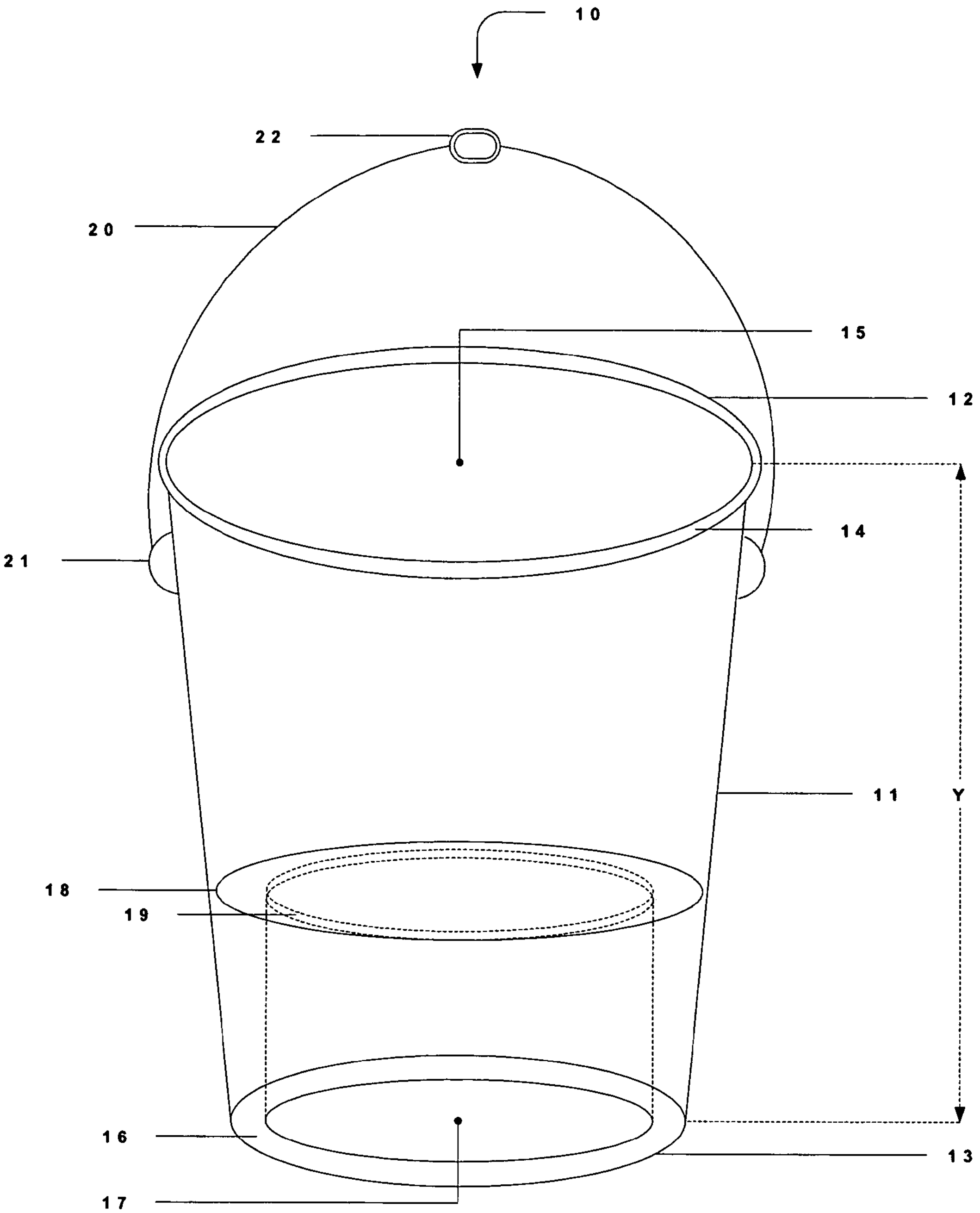
FIGS. 1-16 illustrate various embodiments of a sand sculpture mold according to aspects of the present invention.

FIG. 1 illustrates one embodiment of a sand sculpture mold 10. In this embodiment, the mold 10 includes a hollow receptacle 11 that tapers from a first end 12 to a second end 13 to provide a substantially frustum shape. The first end 12 has a rim 14 defining a first opening 15 in the receptacle 11. The second end 13 has an edge 16 defining a second opening 17 in the receptacle 11.

In various embodiments, the mold 10 includes a removable cover 18 structured and arranged to selective expose and seal the opening 17 in the second end 13. In FIG. 1, the cover 18 is shown in a detached and elevated position. The cover 18 may include a stopper 19 sized to fit tightly within the opening 17. The stopper 19 may be constructed of an elastomeric material such as rubber or foam. In general, the cover 18 when attached to the second end 13 forms a substantially water-tight seal.

As shown, the mold 10 also includes a handle 20 connected to the receptacle 11 by attachment members 21. The handle 20 may include a link 22 for joining segments of the handle 20.

In one of many embodiments, the mold 10 may be formed from a plastic material. Examples of plastics include, for example, Acrylonitrile-butadiene-styrene (ABS) resin, acetal resin, acrylic resin, fluorocarbon polymer, nylon, phenolformaldehyde resin, polybutilene terephthalate, polycarbonate, polyethylene, polyphenylene oxide, polypropylene, polystyrene, reinforced plastics (FRP), ureaformaldehyde resin, acrylic, polyurethane, polyvinylchloride (PVC), thermoplastics, thermoset plastics, and any combinations and/or compositions thereof including fiber reinforced and carbon fiber reinforced combinations and/or compositions thereof. The mold 10 may be formed by injection molding and/or any other technique. The mold 10 also may be constructed of other suitable engineering materials such as one or more metals, alloys, plastics, and/or ceramics.

In one general aspect, the mold 10 may be used to create a sand sculpture by detaching the removable cover 18, inverting the mold 10, placing the first end 12 of the mold on the surface of the sand, pouring sand into the mold 10 through the opening 17 at the second end 13, pouring water into the mold 10 through the opening 17 at the second end 13, allowing the sand to settle and the water to drain, tamping the sand to pack the mold, and repeating the steps of adding sand, adding water, and tamping until the mold is filled. After allowing the sand to sufficiently harden, the mold 10 is lifted up to reveal the sculpture. In some embodiments, segments of the handle 20 may be separated from each other and used to upwardly pull the mold 10.

In general, the dimensions of the mold 10 will vary depending on the desired implementation, and the thickness and rigidity of the mold 10 will vary depending on the choice of materials used for construction. In one embodiment, the mold 10 may include a receptacle 11 having a height dimension Y of about 9.5 inches and a volume of about 2 gallons. In another embodiment, the mold 10 may include a receptacle 11 having a height dimension Y of about 10.5 inches and a volume of about 5 gallons. In yet another embodiment, the mold 10 may include a receptacle 11 having a height dimension Y of about 36 inches and a volume of about 40 gallons. It is noted that 2 gallons of sand has a weight of approximately 20 pounds, 5 gallons of sand has a weight of approximately 50 pounds, and 40 gallons of sand has a weight of approximately 400 pounds. By filling the mold 10 through the second opening 13 and then sliding the mold 10 up and over the sculpture, however, there is no need to lift the weight of the sand. As such, a relatively sturdy sand sculpture can be created using a large volume of sand.

Figure 2:
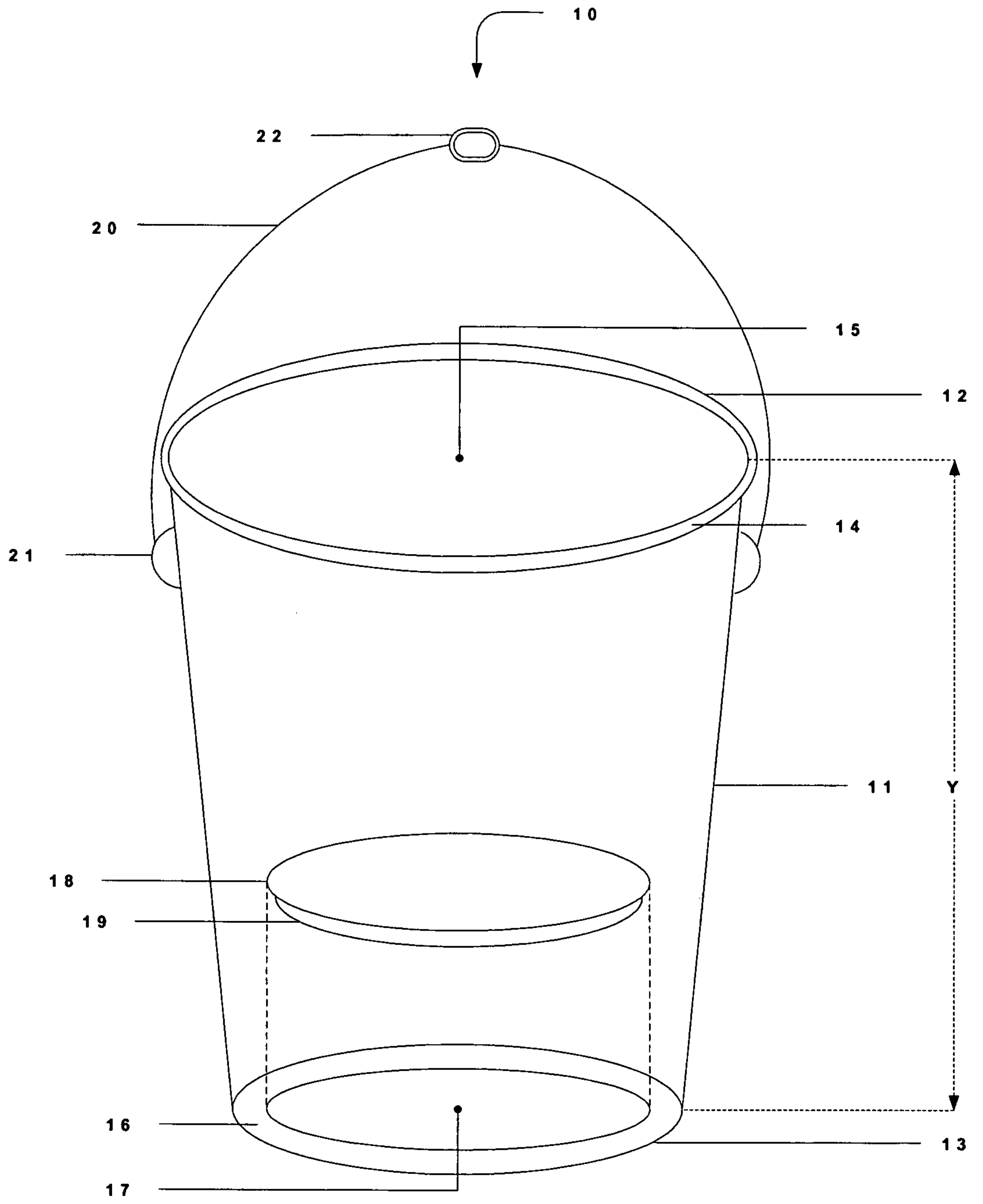

FIG. 2 illustrates another embodiment of a sand sculpture mold 10. In this embodiment, the mold 10 includes a cover 18 having a stopper 19. As shown, the diameter of the cover 18 is larger than the diameter of the second opening 17 but smaller than the diameter of the edge 16. The cover 18 may be removed to expose the second opening 17 and may be attached from inside of the receptacle 11 to the second end 13 to seal the second opening 17. In general, the cover 18 is capable of forming a substantially water-tight seal with the second end 13.

Figure 3:
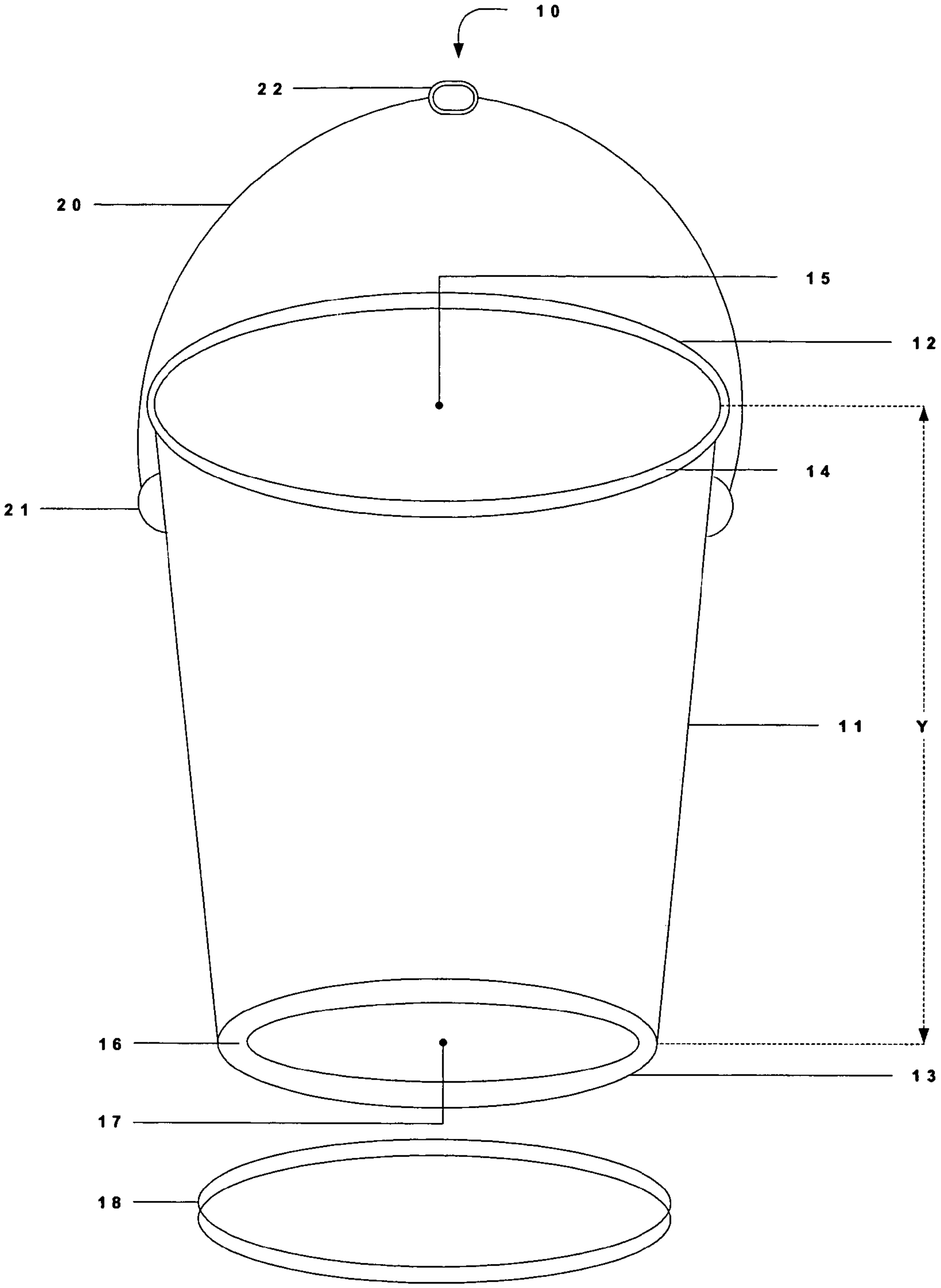

FIG. 3 illustrates another embodiment of a sand sculpture mold 10. In this embodiment, the mold 10 includes a cover 18. As shown, the diameter of the cover 18 is larger than the diameter of the edge 16. The cover 18 may be removed to expose the second opening 17 and may be attached to the second end 13 from outside of the receptacle 11 to seal the second opening 17. The cover 18 may be snap fit or threaded to the receptacle 11, for example. In general, the cover 18 is capable of forming a substantially water-tight seal with the second end 13.

Figure 4:
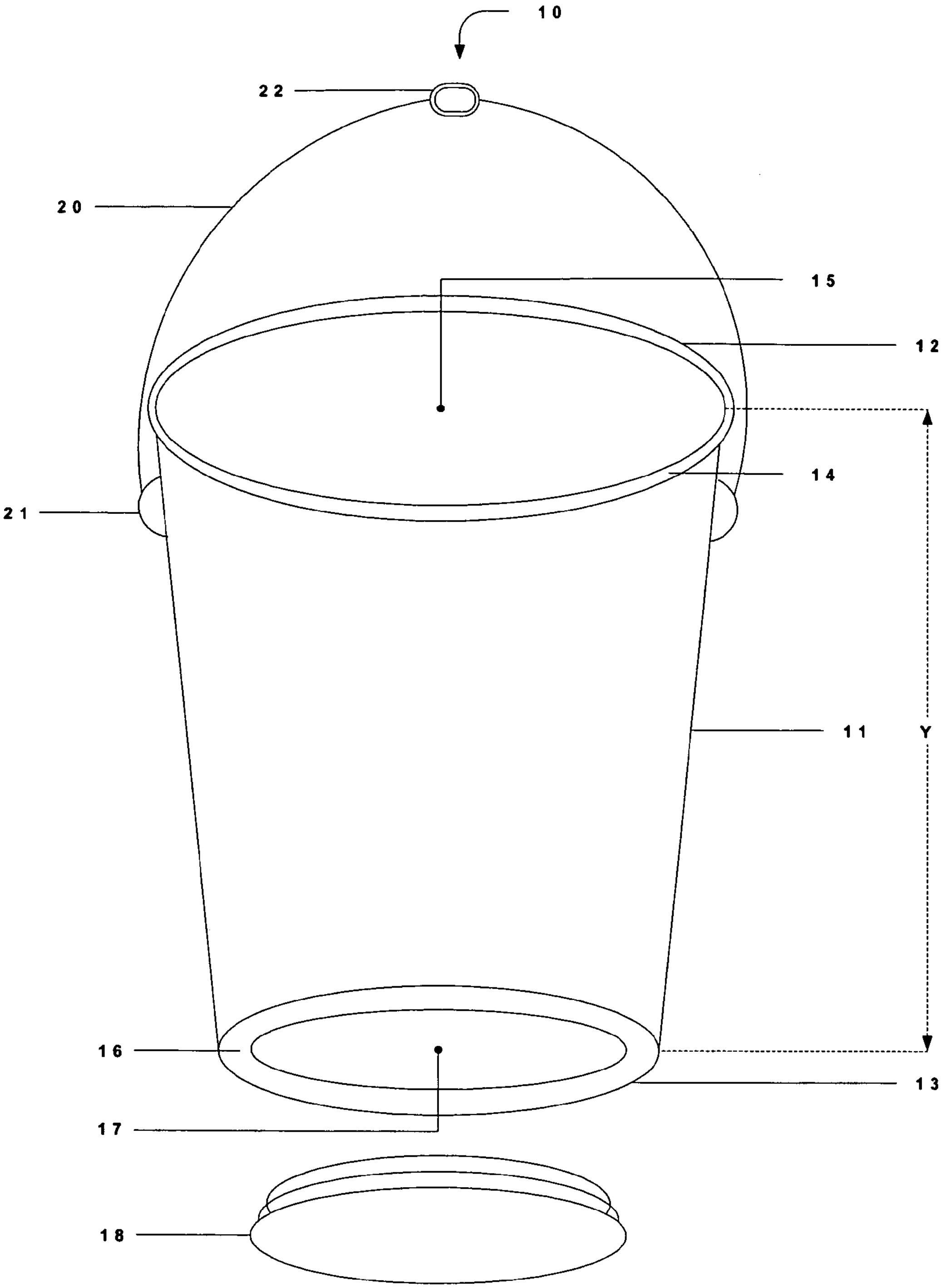

FIG. 4 illustrates another embodiment of a sand sculpture mold 10. In this embodiment, the mold 10 includes a cover 18. As shown, the diameter of the cover 18 is smaller than the diameter of the edge 16. The cover 18 may be removed to expose the second opening 17 and may be attached to the second end 13 from outside of the receptacle 11 to seal the second opening 17. The cover 18 may be snap fit or threaded to the receptacle 11, for example. In general, the cover 18 is capable of forming a substantially water-tight seal with the second end 13.

Figure 5:
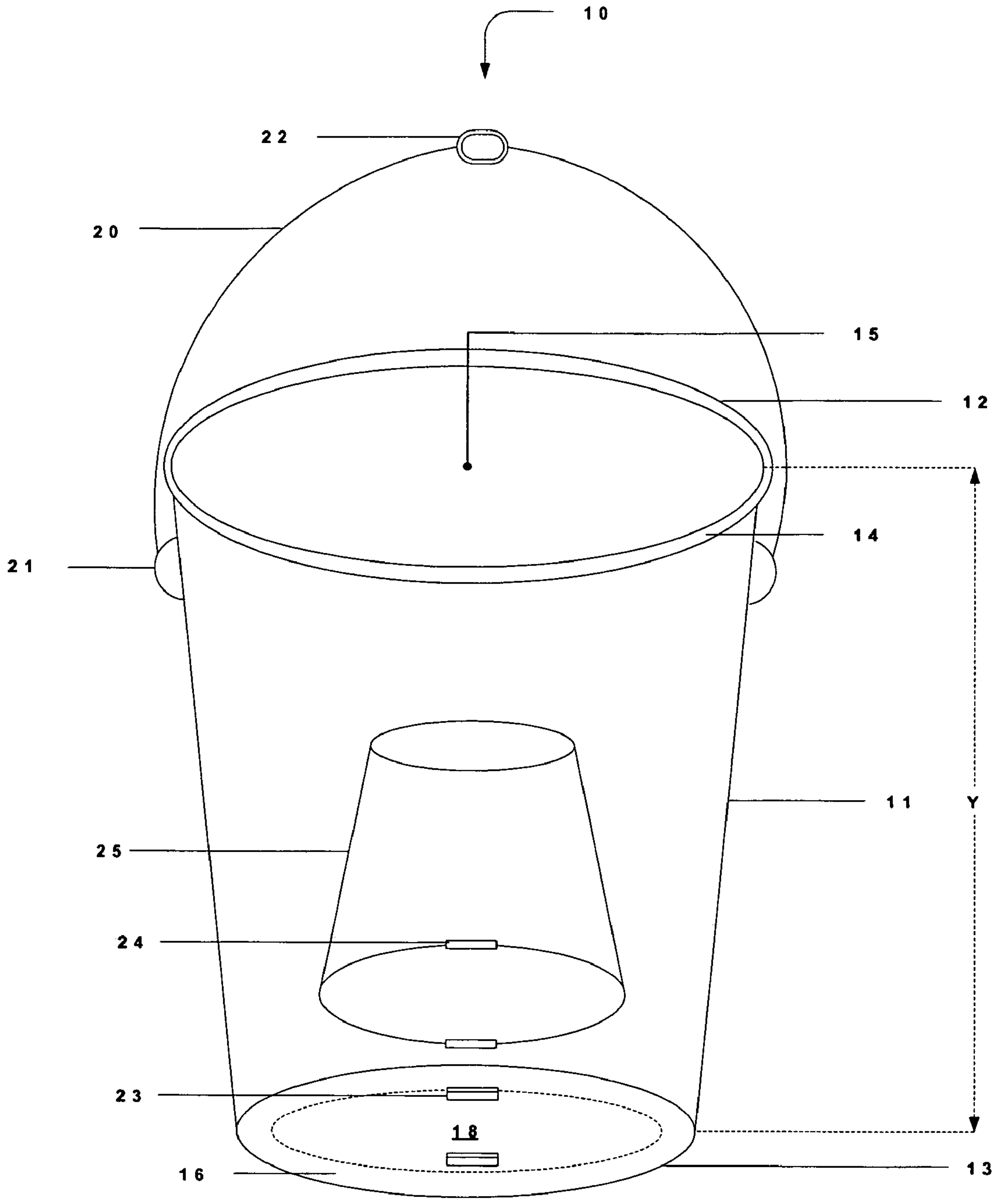

FIG. 5 illustrates another embodiment of a sand sculpture mold 10. In this embodiment, the mold 10 includes a cover 18 that may be removed to expose an opening in the second end 13 defined by the edge 16 and that may be attached to the second end 13 to form a substantially water-tight seal. As shown, the cover 18 includes a first connection mechanism 23 for attaching to a corresponding second connection mechanism 24 on a second receptacle 25. In this embodiment, the second receptacle 25 may be snap fit or twist locked to the cover 18, for example. In general, the second receptacle 25, when detached may be used to pour sand and/or water into the first receptacle 11 when creating a first sand sculpture. The second receptacle 25 then may be used to create a second sand sculpture on top of the first sand sculpture created with the first receptacle 11. In one embodiment, the diameter of the second receptacle 25 is less than the diameter of the opening in the second end 13 so that the first receptacle 11 may be lifted and slid up and over the first sand sculpture and the second sand sculpture.

Figure 6:
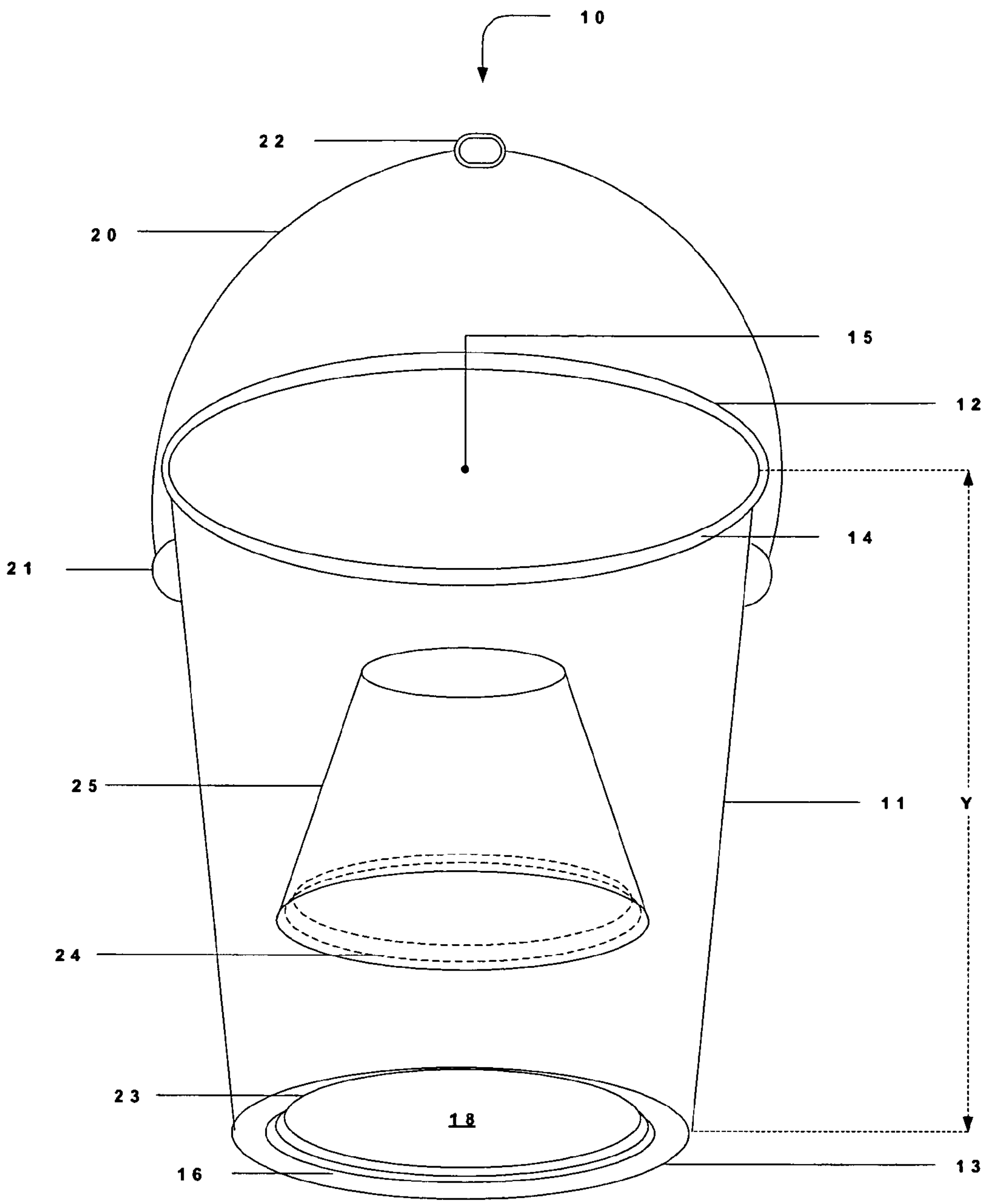

FIG. 6 illustrates another embodiment of a sand sculpture mold 10. In this embodiment, the mold 10 includes a cover 18 that may be removed to expose an opening in the second end 13 defined by the edge 16 and that may be attached to the second end 13 to form a substantially water-tight seal. As shown, the cover 18 includes a first connection mechanism 23 for attaching to a corresponding second connection mechanism 24 on the second receptacle 25. In this embodiment, the second receptacle 25 may be threaded to the cover 18, for example. In general, the second receptacle 25, when detached may be used to pour sand and/or water into the first receptacle 11 when creating a first sand sculpture. The second receptacle 25 then may be used to create a second sand sculpture on top of the first sand sculpture created with the first receptacle 11. In one embodiment, the diameter of the second receptacle 25 is less than the diameter of the opening in the second end 13 so that the first receptacle 11 may be lifted and slid up and over the first sand sculpture and the second sand sculpture.

Figure 7:
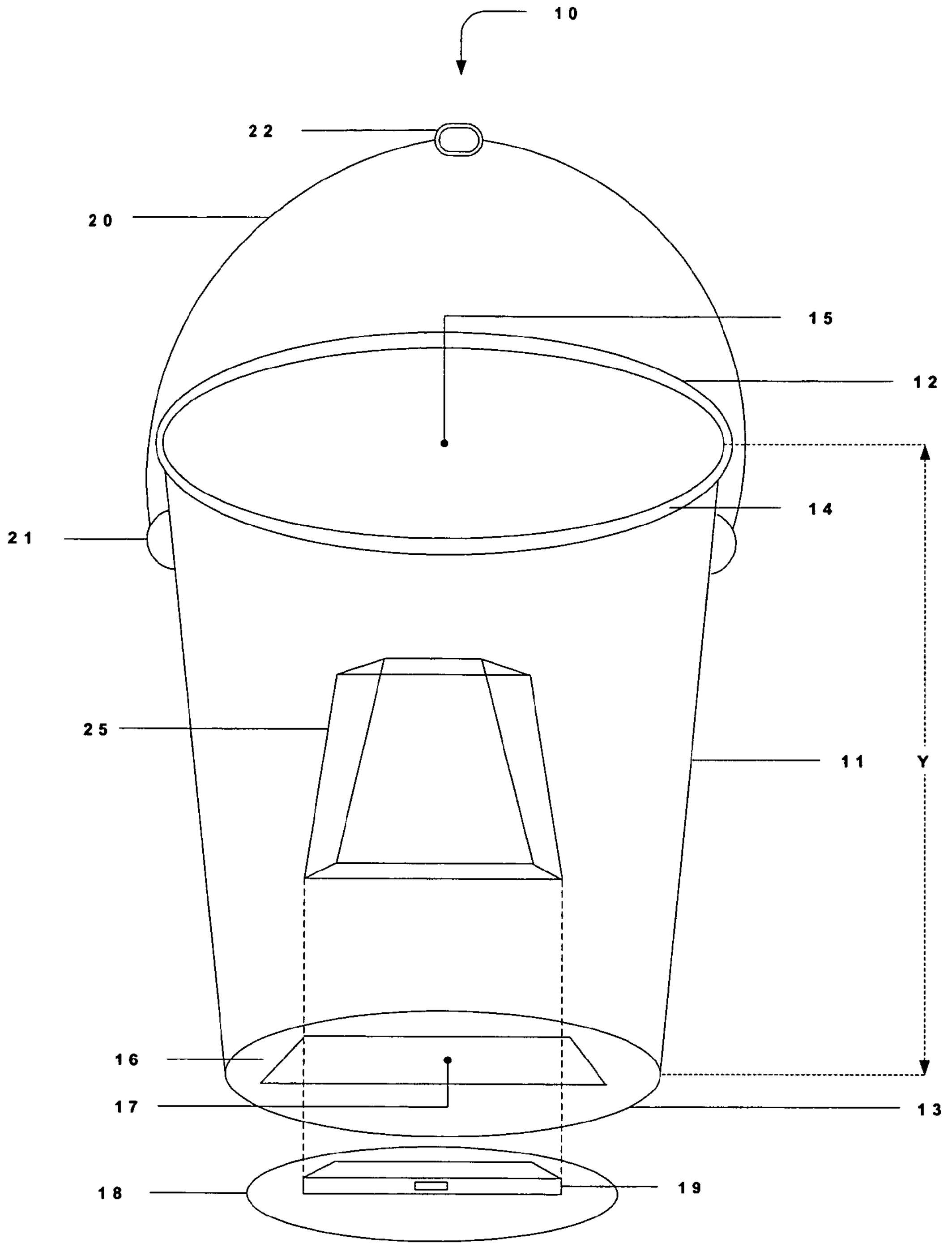

FIG. 7 illustrates another embodiment of a sand sculpture mold 10. In this embodiment, the mold 10 includes a cover 18 that may be removed to expose an opening 17 in the second end 13 defined by the edge 16 and that may be attached to the second end 13 to form a substantially water-tight seal. As shown, the cover 18 includes a first connection mechanism 23 for attaching to a corresponding second connection mechanism 24 on the second receptacle 25. In this embodiment, the second receptacle 25 may be snap fit to the cover 18, for example. In general, the second receptacle 25, when detached may be used to pour sand and/or water into the first receptacle 11 when creating a first sand sculpture. The second receptacle 25 then may be used to create a second sand sculpture on top of the first sand sculpture created with the first receptacle 11. In one embodiment, the opening 17 has a geometric configuration (e.g., square, rectangle) that is different from a geometric configuration (e.g., circle, oval) of the cover 18. The second receptacle 25 may be sized so that the first receptacle 11 may be lifted and slid up and over the first sand sculpture and the second sand sculpture.

Figure 8:
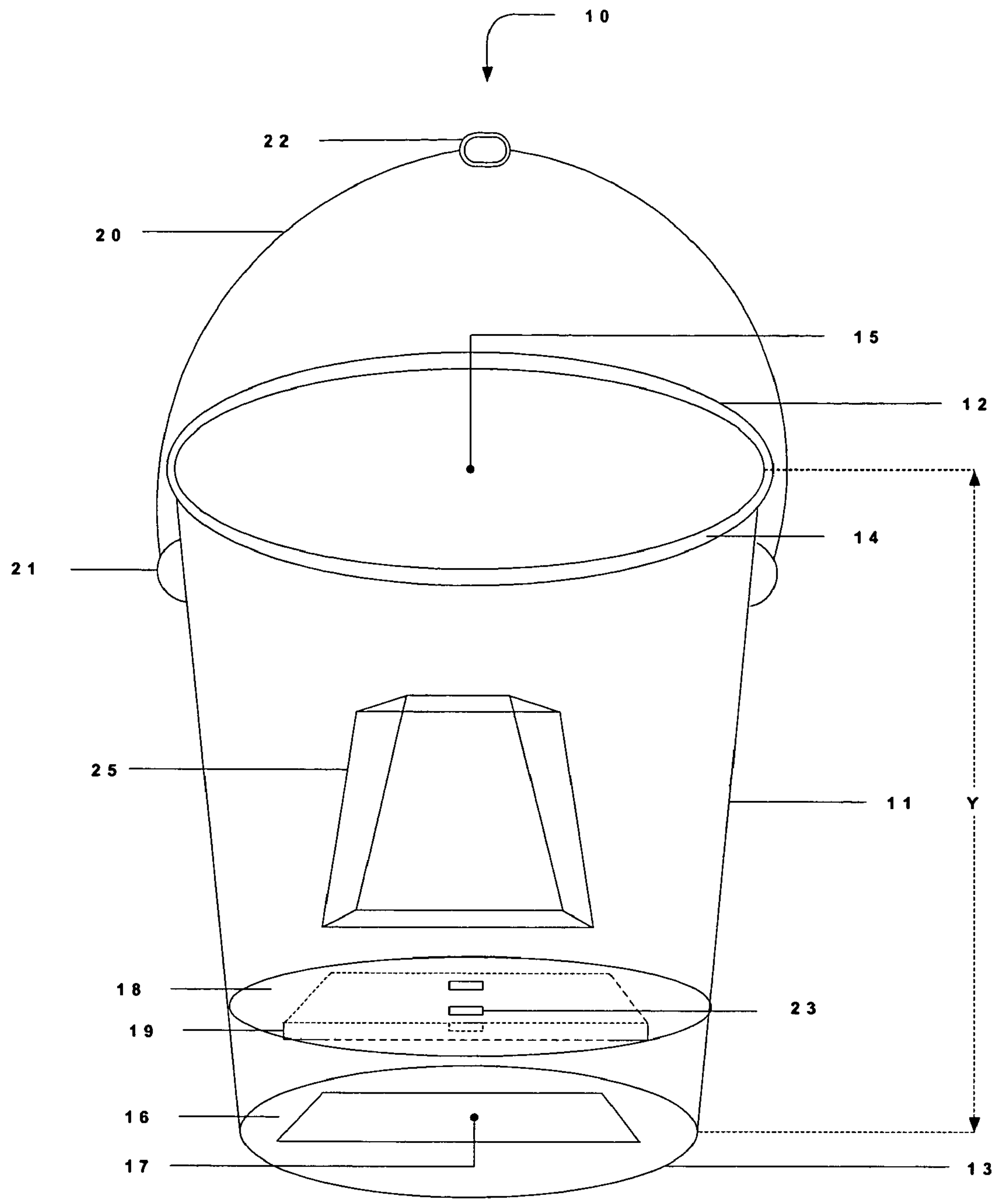

FIG. 8 illustrates another embodiment of a sand sculpture mold 10. In this embodiment, the mold 10 includes a cover 18 that may be removed to expose an opening 17 in the second end 13 defined by the edge 16 and that may be attached to the second end 13 to form a substantially water-tight seal. As shown, the cover 18 includes a stopper 19 that may fit tightly in the opening 17 and a first connection mechanism 23 for attaching to the second receptacle 25. In this embodiment, the second receptacle 25 may be snap fit to the cover 18, for example. In general, the second receptacle 25, when detached may be used to pour sand and/or water into the first receptacle 11 when creating a first sand sculpture. The second receptacle 25 then may be used to create a second sand sculpture on top of the first sand sculpture created with the first receptacle 11. In one embodiment, the opening 17 has a geometric configuration (e.g., square, rectangle) that is different from a geometric configuration (e.g., circle, oval) of the cover 18. The second receptacle 25 may be sized so that the first receptacle 11 may be lifted and slid up and over the first sand sculpture and the second sand sculpture.

Figure 9:
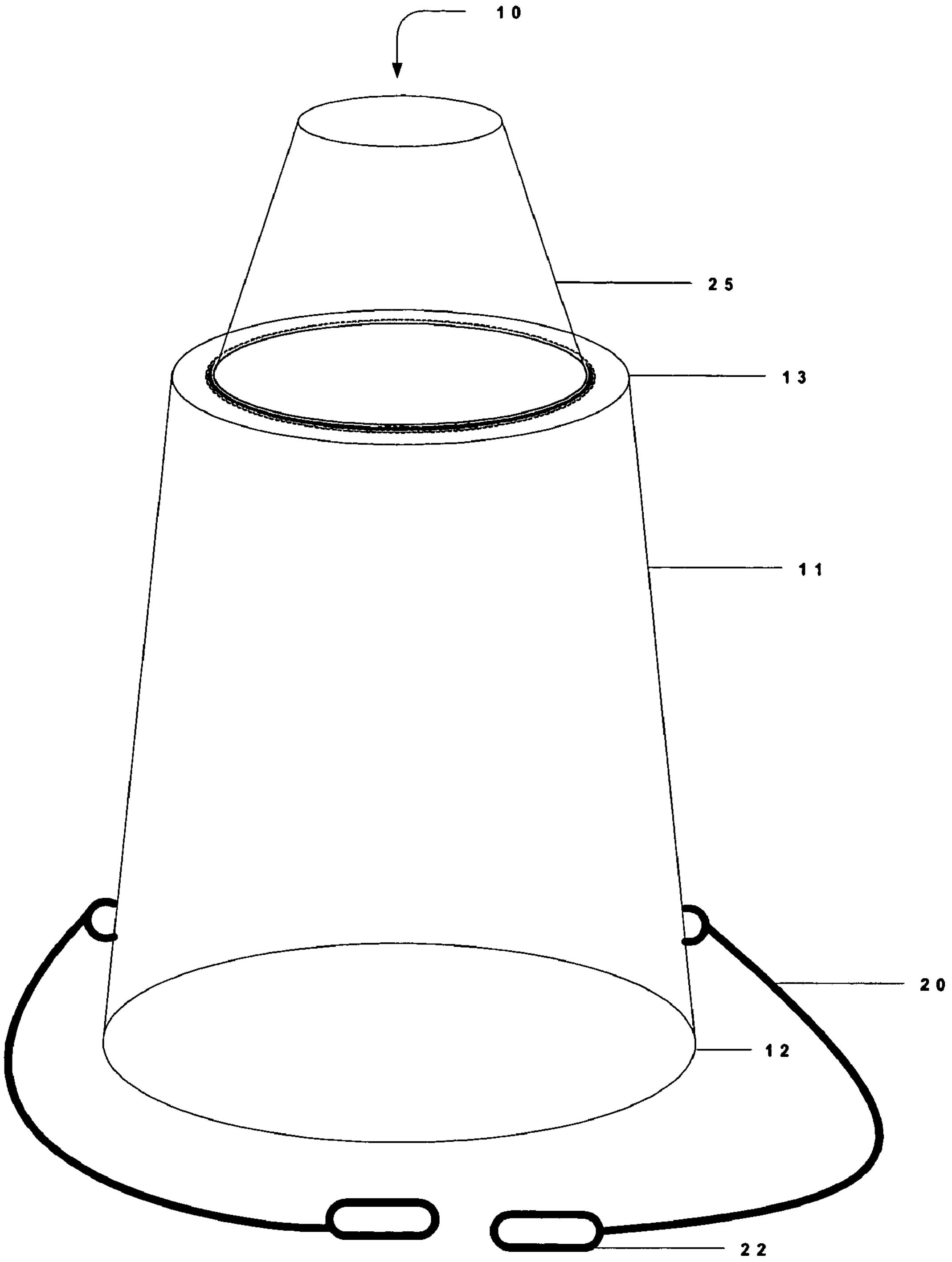

FIG. 9 illustrates another embodiment of a sand sculpture mold 10. In this embodiment, the mold 10 includes a receptacle 11 and a cover that has been removed to expose an opening in the second end 13. A sand sculpture is created by inverting the receptacle 11 to placing the first end 12 of the mold on the surface of the sand. Sand is poured into the receptacle 11 through the opening at the second end 13. Water is poured into the receptacle 11 through the opening at the second end 13. The sand is allowed to settle, and the water is allowed to drain. The sand is tamped so that the sand is compressed and assumes the shape of the receptacle 11. The steps of adding sand, adding water, and tamping are repeated until the receptacle 11 is filled. After allowing the sand to sufficiently harden, the second receptacle 25 is used to create a second sand sculpture on top of the first sand sculpture. The second receptacle 25 is removed to reveal the second sand structure. Then, the first receptacle 11 is lifted using the separated segments of the handle 20. The first receptacle 11 is sized to slide up and over the first sand sculpture and the second sand sculpture.

Figure 10:
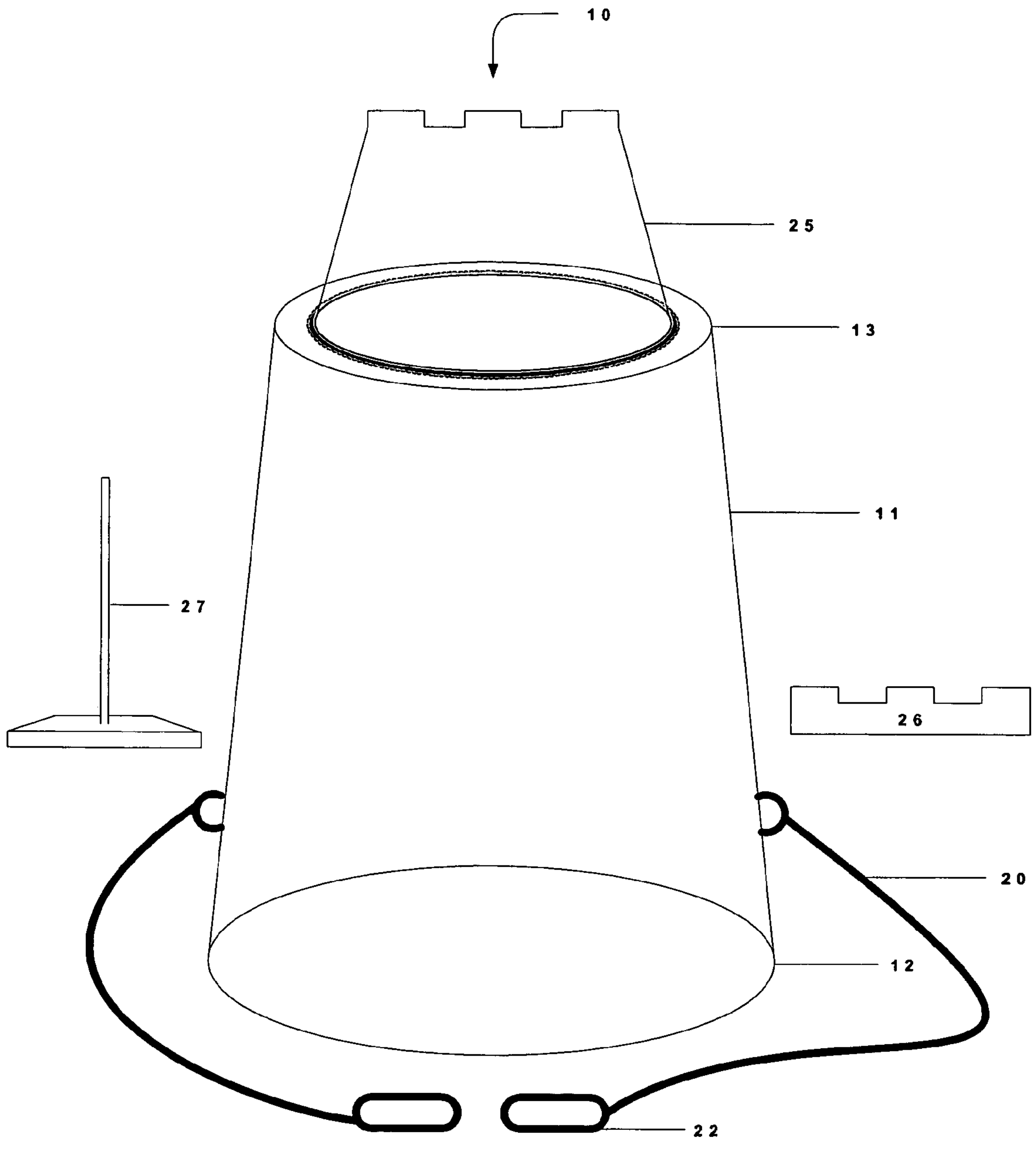

FIG. 10 illustrates a sand sculpting kit including another embodiment of a sand sculpture mold 10. In this embodiment, the mold 10 includes a receptacle 11 and a cover that has been removed to expose an opening in the second end 13. A sand sculpture is created by inverting the receptacle 11 to placing the first end 12 of the mold on the surface of the sand. Sand is poured into the receptacle 11 through the opening at the second end 13. Water is poured into the receptacle 11 through the opening at the second end 13. The sand is allowed to settle, and the water is allowed to drain. The sand is tamped so that the sand is compressed and assumes the shape of the receptacle 11. The steps of adding sand, adding water, and tamping are repeated until the receptacle 11 is filled. After allowing the sand to sufficiently harden, the second receptacle 25 is used to create a second sand sculpture on top of the first sand sculpture. The second receptacle 25 is removed to reveal the second sand structure. Then, the first receptacle 11 is lifted using the separated segments of the handle 20. The first receptacle 11 is sized to slide up and over the first sand sculpture and the second sand sculpture. As shown, the sand sculpting kit may include a second receptacle 25 having a plurality of projections, a hollow wall mold 26 shaped to engage the second receptacle 25, and a tamping tool 27.

Figure 11:
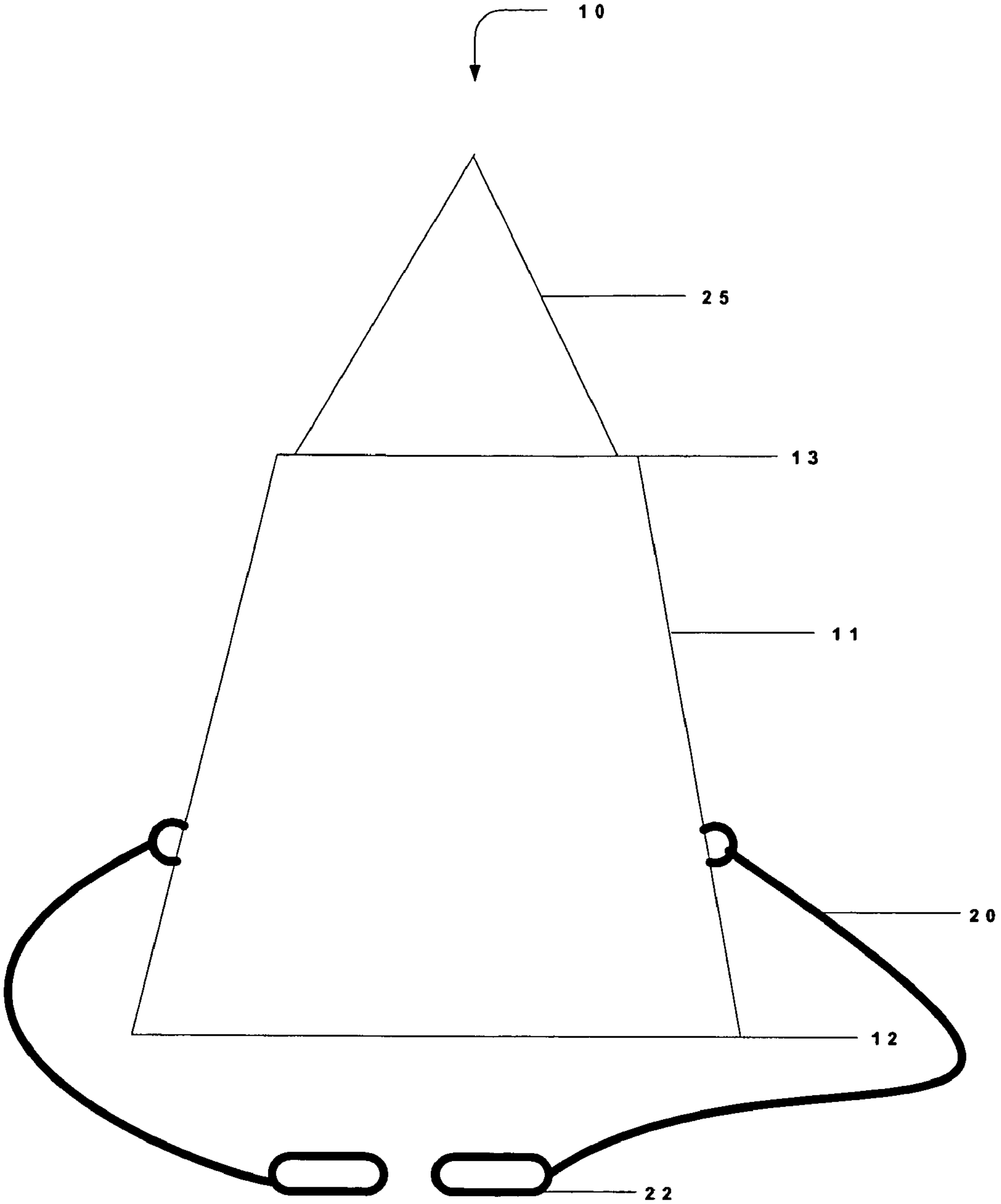

FIG. 11 illustrates another embodiment of a sand sculpture mold 10. In this embodiment, the mold 10 includes a receptacle 11 and a cover that has been removed to expose an opening in the second end 13. A sand sculpture is created by inverting the receptacle 11 to placing the first end 12 of the mold on the surface of the sand. Sand is poured into the receptacle 11 through the opening at the second end 13. Water is poured into the receptacle 11 through the opening at the second end 13. The sand is allowed to settle, and the water is allowed to drain. The sand is tamped so that the sand is compressed and assumes the shape of the receptacle 11. The steps of adding sand, adding water, and tamping are repeated until the receptacle 11 is filled. After allowing the sand to sufficiently harden, the second receptacle 25 is used to create a second sand sculpture on top of the first sand sculpture. The second receptacle 25 is removed to reveal the second sand structure. Then, the first receptacle 11 is lifted using the separated segments of the handle 20. The first receptacle 11 is sized to slide up and over the first sand sculpture and the second sand sculpture. As shown, the first receptacle 11 may have trapezoidal sides, and the second receptacle 25 may have a substantially conical shape to create a sand sculpture having a substantially pyramidal shape.

Figure 12:
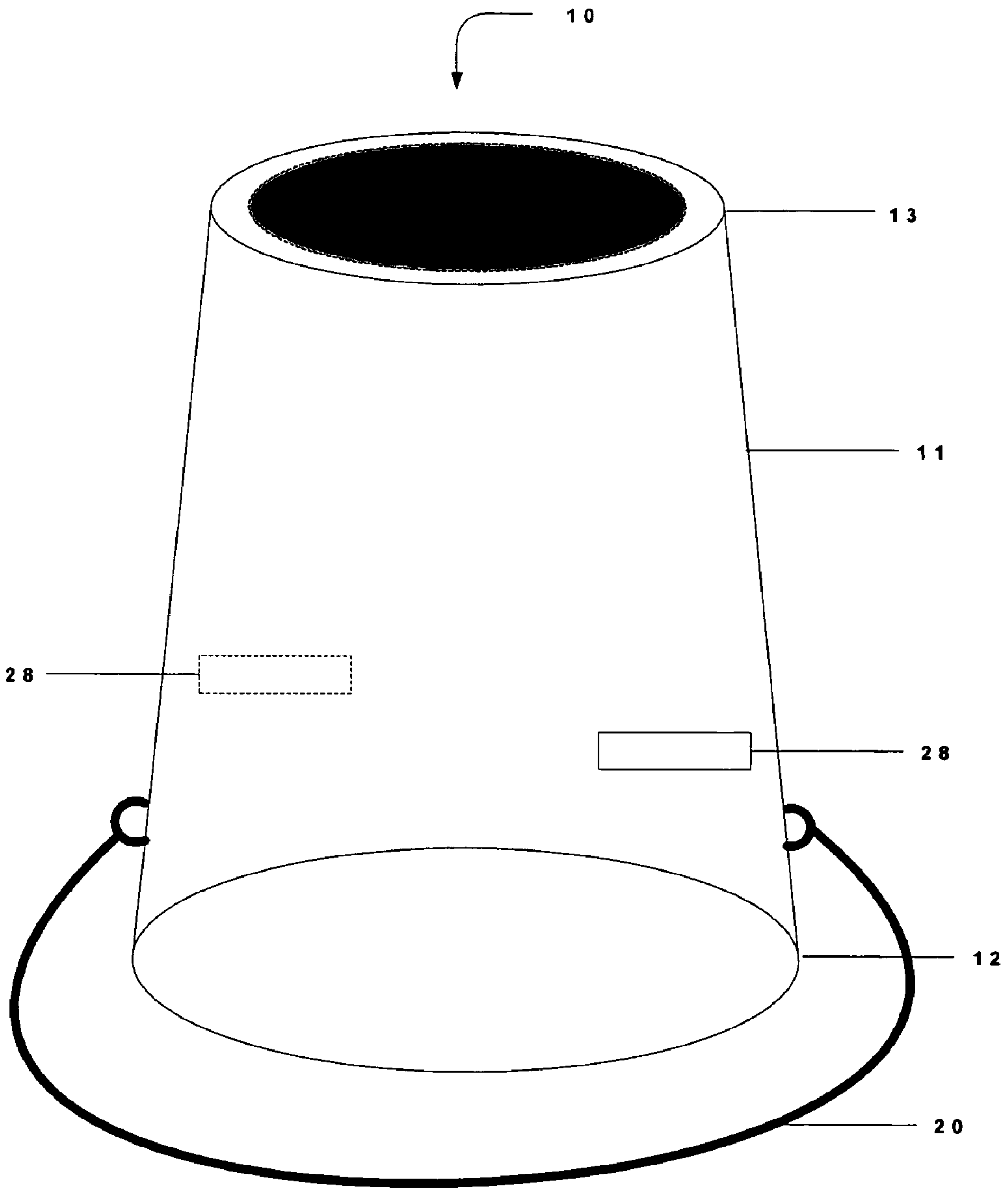

FIG. 12 illustrates another embodiment of a sand sculpture mold 10. In this embodiment, the mold 10 includes a receptacle 11 and a cover that has been removed to expose an opening in the second end 13. A sand sculpture is created by inverting the receptacle 11 to placing the first end 12 of the mold on the surface of the sand. Sand is poured into the receptacle 11 through the opening at the second end 13. Water is poured into the receptacle 11 through the opening at the second end 13. The sand is allowed to settle, and the water is allowed to drain. The sand is tamped so that the sand is compressed and assumes the shape of the receptacle 11. The steps of adding sand, adding water, and tamping are repeated until the receptacle 11 is filled. After allowing the sand to sufficiently harden, the receptacle 11 is lifted upwardly using grips 28, such as opposed projections or indentations, for example, to reveal the sand sculpture.

Figure 13:
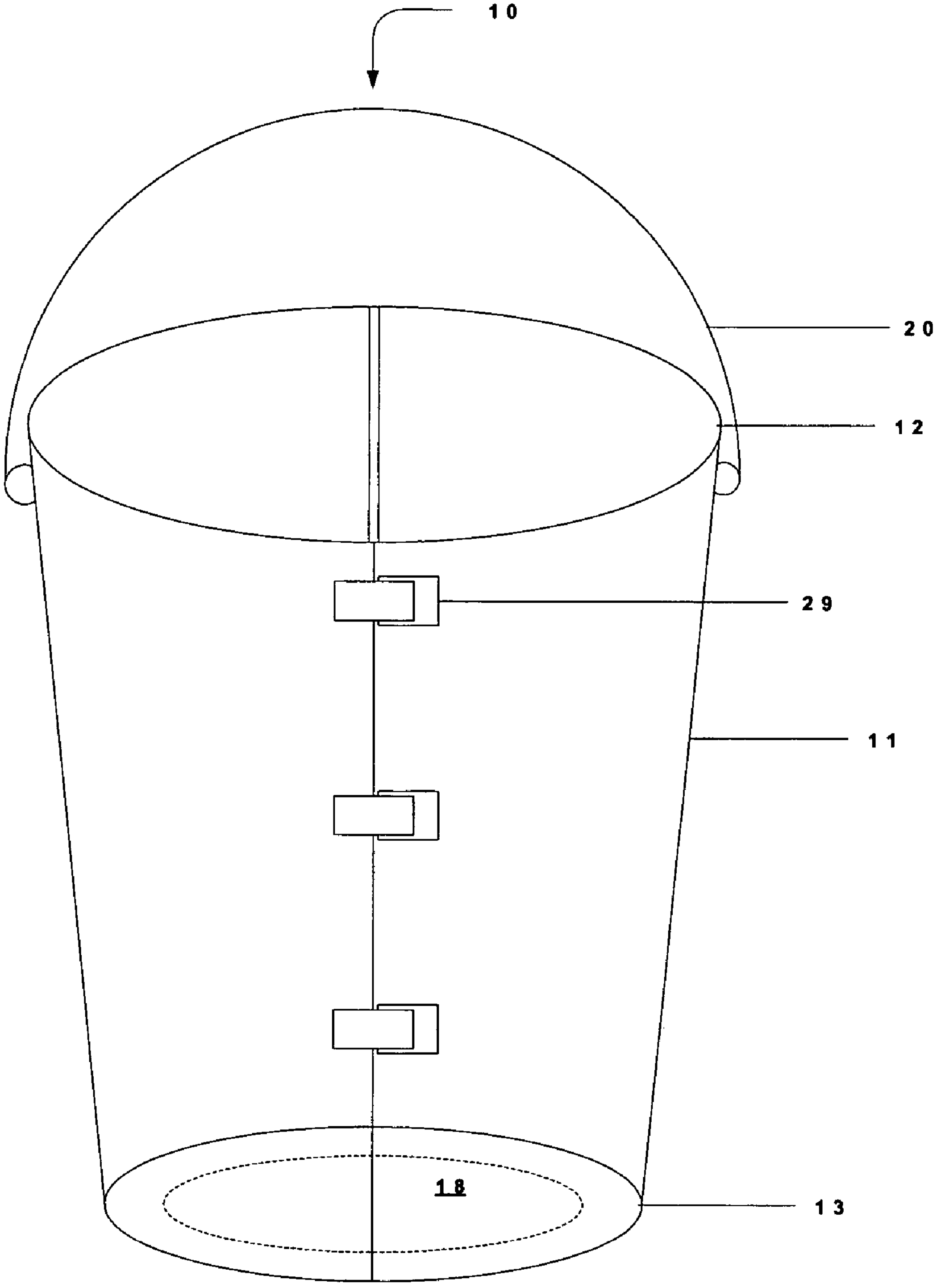

FIG. 13 illustrates another embodiment of a sand sculpture mold 10. In this embodiment, the mold 10 includes a receptacle 11 and a cover 18 that may be removed to expose an opening in the second end 13. A sand sculpture may be created by inverting the receptacle 11 to placing the first end 12 of the mold on the surface of the sand. Sand may be poured into the receptacle 11 through the opening at the second end 13. Water may be poured into the receptacle 11 through the opening at the second end 13. The sand may be allowed to settle, and the water allowed to drain. The sand may be tamped so that the sand is compressed and assumes the shape of the receptacle 11. The steps of adding sand, adding water, and tamping may be repeated until the receptacle 11 is filled. After allowing the sand to sufficiently harden, the receptacle 11 may be separated by opening by latches 29 and slid back and away to reveal the sand sculpture.

Figure 14:
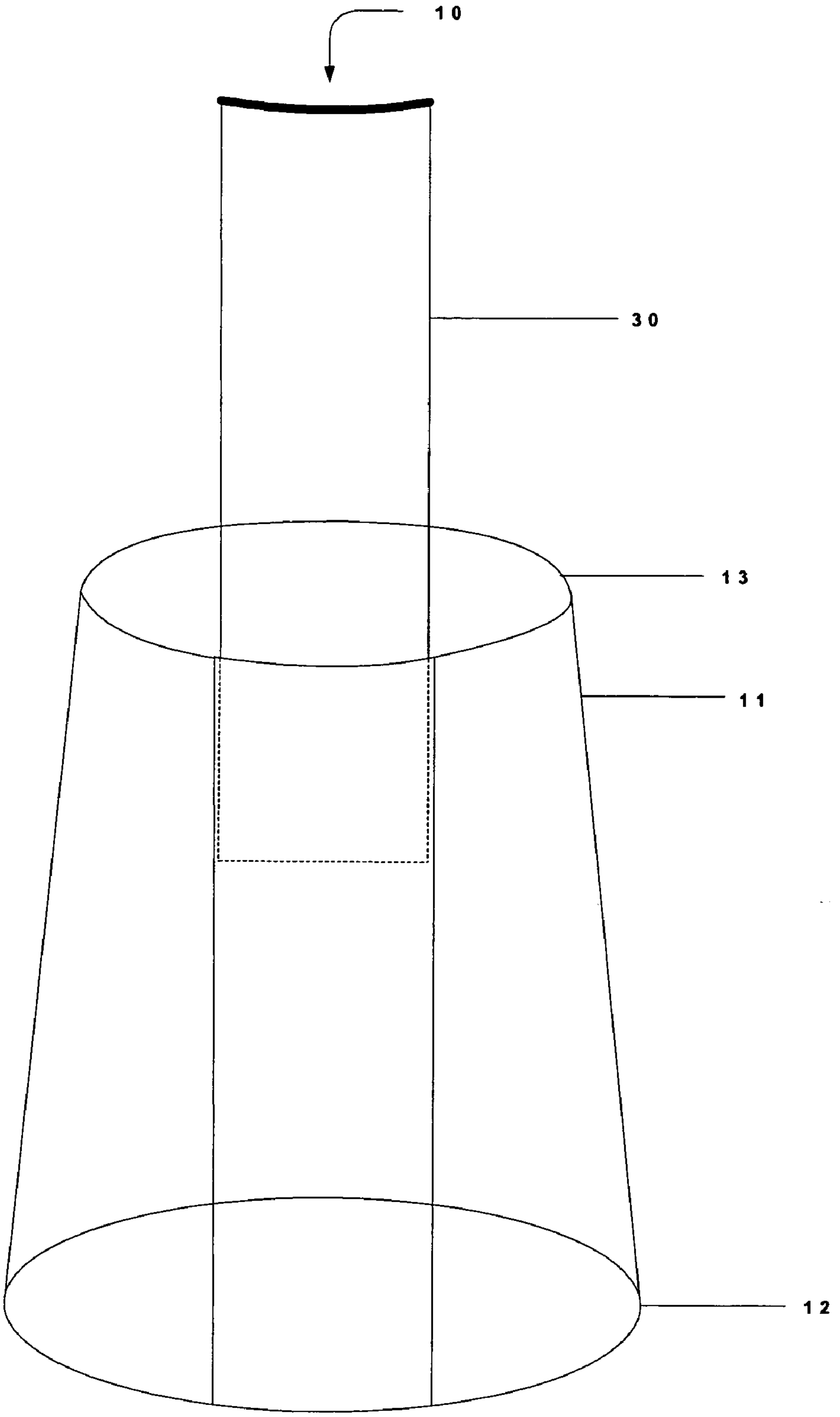

FIG. 14 illustrates another embodiment of a sand sculpture mold 10. In this embodiment, the mold 10 includes a receptacle 11 and a cover that may be removed to expose an opening in the second end 13. A sand sculpture may be created by inverting the receptacle 11 to placing the first end 12 of the mold on the surface of the sand. Sand may be poured into the receptacle 11 through the opening at the second end 13. Water may be poured into the receptacle 11 through the opening at the second end 13. The sand may be allowed to settle, and the water allowed to drain. The sand may be tamped so that the sand is compressed and assumes the shape of the receptacle 11. The steps of adding sand, adding water, and tamping may be repeated until the receptacle 11 is filled. After allowing the sand to sufficiently harden, one or more panels 30 may be slid out of the receptacle 11. In one embodiment, the removal of the panels 30 reveals the sand sculpture. In another embodiment, the panels 30 form an inner surface of the receptacle 11 that contacts the sand sculpture. Removing the panels 30 breaks some of the contact between the receptacle 11 and the sand sculpture. As such it becomes easier to lift and slide the receptacle 11 upwardly to reveal the sand sculpture.

Figure 15:
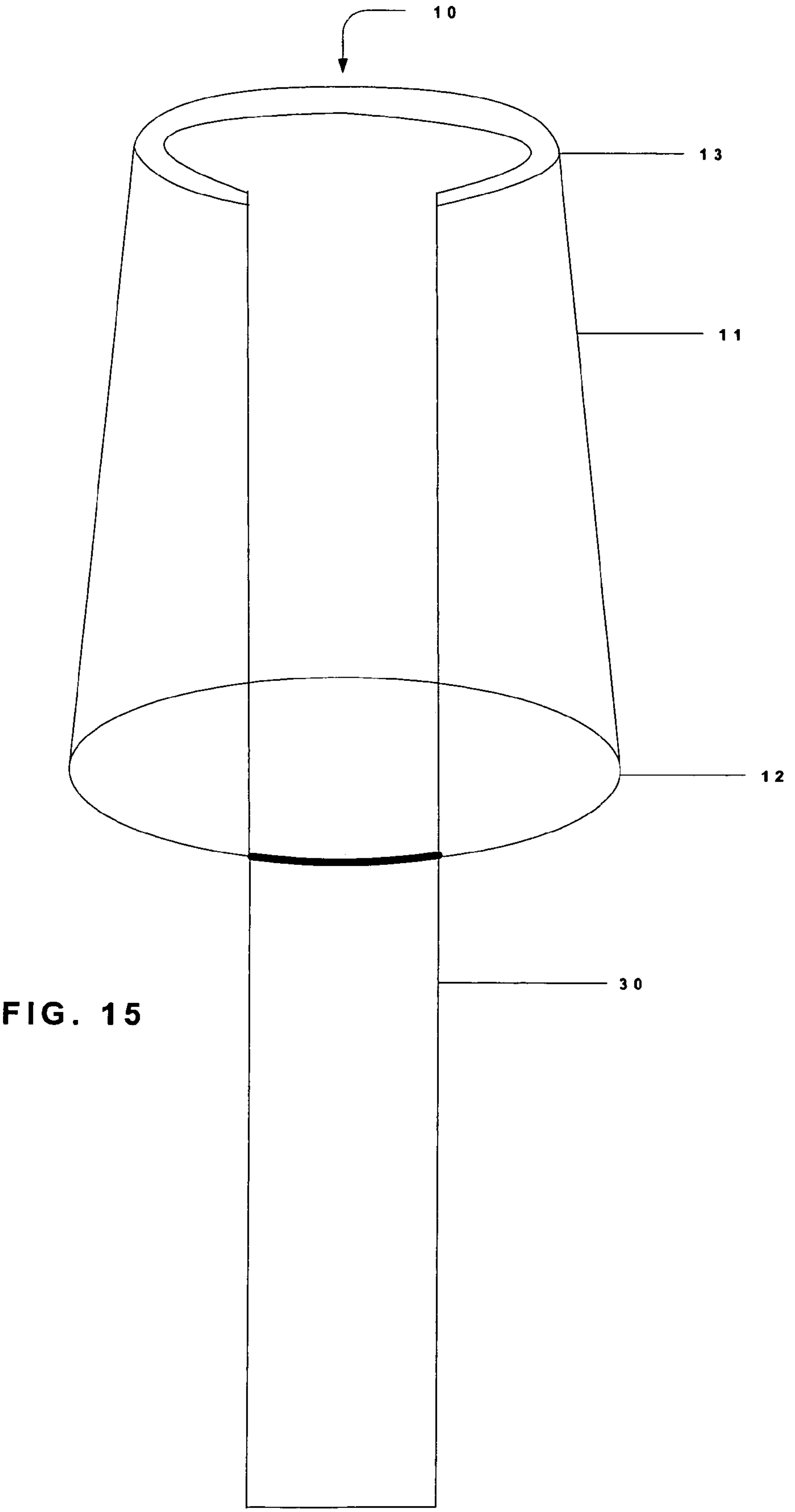

FIG. 15 illustrates another embodiment of a sand sculpture mold 10. In this embodiment, the mold 10 includes a receptacle 11 and a cover that may be removed to expose an opening in the second end 13. A sand sculpture may be created by inverting the receptacle 11 to placing the first end 12 of the mold on the surface of the sand. Sand may be poured into the receptacle 11 through the opening at the second end 13. Water may be poured into the receptacle 11 through the opening at the second end 13. The sand may be allowed to settle, and the water allowed to drain. The sand may be tamped so that the sand is compressed and assumes the shape of the receptacle 11. The steps of adding sand, adding water, and tamping may be repeated until the receptacle 11 is filled. After allowing the sand to sufficiently harden, one or more panels 30 may be folded down to reveal the sand sculpture.

Figure 16:
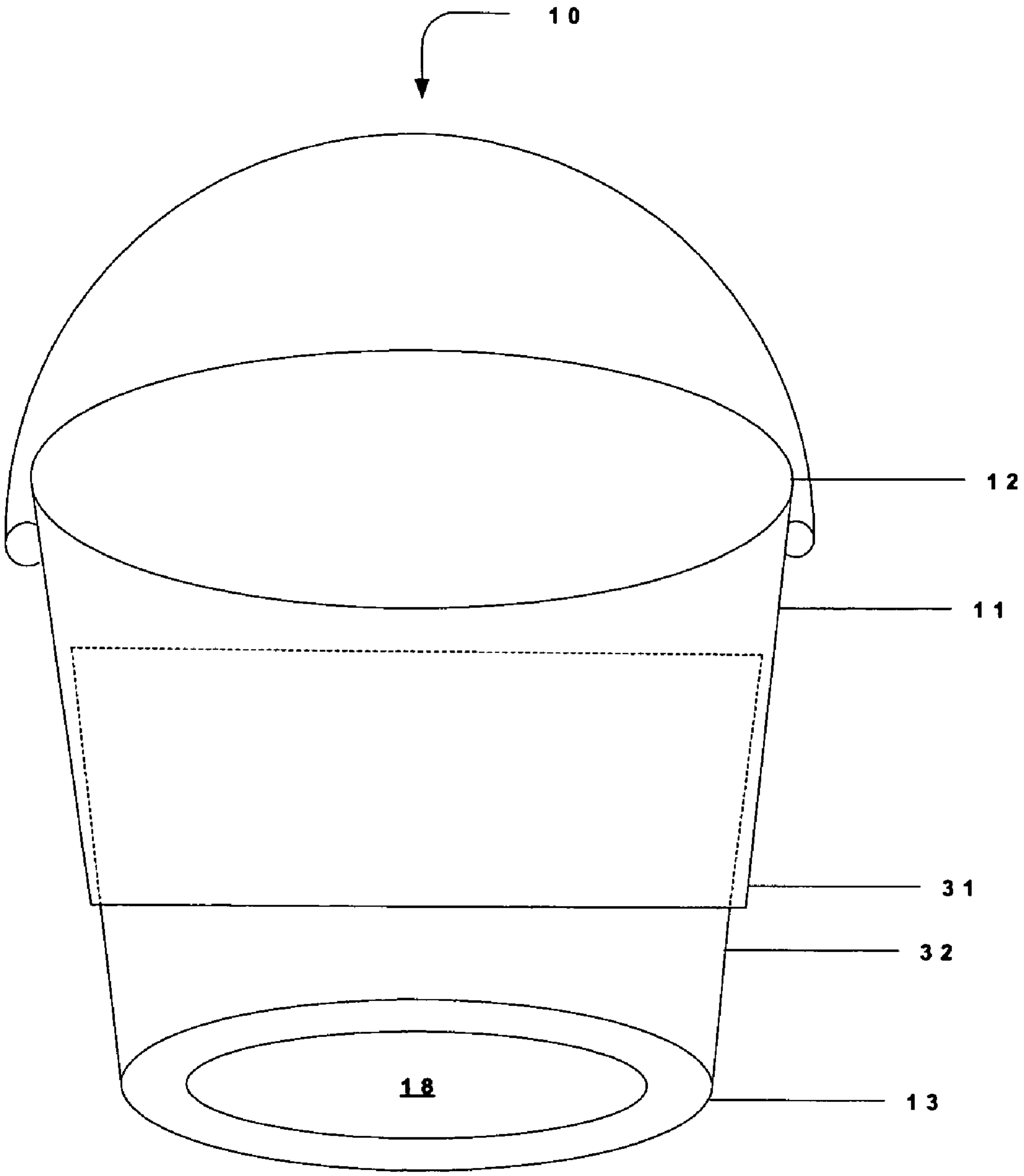

FIG. 16 illustrates another embodiment of a sand sculpture mold 10. In this embodiment, the mold 10 includes a receptacle 11 and a cover 18 that may be removed to expose an opening in the second end 13. The receptacle 11 includes a first telescoping portion 31 and a second telescoping portion 32. After removing the cover 18, a sand sculpture may be created by extending and connecting the first telescoping portion 31 and the second telescoping portion 32, inverting the receptacle 11, and placing the first end 12 of the mold on the surface of the sand. Sand may be poured into the receptacle 11 through the opening at the second end 13. Water may be poured into the receptacle 11 through the opening at the second end 13. The sand may be allowed to settle, and the water allowed to drain. The sand may be tamped so that the sand is compressed and assumes the shape of the receptacle 11. The steps of adding sand, adding water, and tamping may be repeated until the receptacle 11 is filled. After allowing the sand to sufficiently harden, the receptacle 11 is lifted and slid upwardly to reveal the sand sculpture.

Although the present invention has been described with regard to certain embodiments, those of ordinary skill in the art will recognize that many modifications and variations of the present invention may be implemented. Although the specific embodiments of the several examples described have geometric shapes, the scope of the present invention may encompass any irregular shape or form consistent with aspects of the present invention. The foregoing description and the following claims are intended to cover all such combinations, modifications, and variations of the described embodiments. Furthermore, the components and processes disclosed are illustrative, but are not exhaustive. Other components and processes also may be used to make systems and methods embodying the present invention.

What is claimed is:

1. A sand sculpture mold comprising:

a hollow receptacle defining a sand sculpture shape, the receptacle tapering from a first end to a second end, the first end having a rim defining a first opening in the receptacle, the second end having an edge projecting inwardly from the second end and defining a second opening in the receptacle; and a removable cover structured and arranged to selectively expose the second opening and selectively form a substantially water-tight seal in the second end, the cover comprising a stopper constructed of an elastomeric material and sized to fit within the second opening.

2. The sand sculpture mold of claim 1, wherein the cover is configured to attach to the second end of the receptacle from inside the receptacle.

3. The sand sculpture mold of claim 1, wherein the cover is configured to attach to the second end of the receptacle from outside the receptacle.

4. A sand sculpture mold comprising:

a hollow receptacle defining a sand sculpture share, the receptacle tapering from a first end to a second end, the first end having a rim defining a first opening in the receptacle, the second end having an edge projecting inwardly from the second end and defining a second opening in the receptacle; and a removable cover structured and arranged to selectively expose the second opening and selectively form a substantially water-tight seal in the second end, wherein the cover is configured to attach to the second end of the receptacle by snap fit engagement.

5. A sand sculpture mold comprising:

a hollow receptacle defining a sand sculpture share, the receptacle tapering from a first end to a second end, the first end having a rim defining a first opening in the receptacle, the second end having an edge projecting inwardly from the second end and defining a second opening in the receptacle; and a removable cover structured and arranged to selectively expose the second opening and selectively form a substantially water-tight seal in the second end, wherein the cover is configured to attach to the second end of the receptacle by threaded engagement.

6. A sand sculpture mold comprising:

a hollow receptacle defining a sand sculpture shape, the receptacle tapering from a first end to a second end, the first end having a rim defining a first opening in the receptacle, the second end having an edge projecting inwardly from the second end and defining a second opening in the receptacle;

a removable cover structured and arranged to selectively expose the second opening and selectively form a substantially water-tight seal in the second end; and a handle attached to the receptacle.

7. The sand sculpture mold of claim 6, wherein the handle comprises a link joining separable segments of the handle.

8. A sand sculpture mold comprising:

a hollow first receptacle defining a sand sculpture share, the first receptacle tapering from a first end to a second end, the first end having a rim defining a first opening in the first receptacle, the second end having an edge projecting inwardly from the second end and defining a second opening in the first receptacle;

a removable cover structured and arranged to selectively expose the second opening and selectively form a substantially water-tight seal in the second end; and a second receptacle.

9. The sand sculpture mold of claim 8, wherein the second receptacle is structured and arranged to be removably attached to the cover.

10. A sand sculpture mold comprising:

a hollow receptacle defining a sand sculpture share, the receptacle tapering from a first end to a second end, the first end having a rim defining a first opening in the receptacle, the second end having an edge projecting inwardly from the second end and defining a second opening in the receptacle, wherein the receptacle comprises one or more grips; and a removable cover structured and arranged to selectively expose the second opening and selectively form a substantially water-tight seal in the second end.

11. The sand sculpture mold of claim 1, wherein the receptacle comprises one or more latches.

12. A sand sculpture mold comprising:

a hollow receptacle defining a sand sculpture share, the receptacle tapering from a first end to a second end, the first end having a rim defining a first opening in the receptacle, the second end having an edge projecting inwardly from the second end and defining a second opening in the receptacle, wherein the receptacle comprises one or more panels; and a removable cover structured and arranged to selectively expose the second opening and selectively form a substantially water-tight seal in the second end.

13. The sand sculpture mold of claim 12, wherein at least one panel is structured and arranged to slide out from the receptacle.

14. The sand sculpture mold of claim 12, wherein at least one panel is structured and arranged to fold away from the receptacle.

15. A sand sculpture mold comprising:

a hollow receptacle defining a sand sculpture share, the receptacle tapering from a first end to a second end, the first end having a rim defining a first opening in the receptacle, the second end having an edge projecting inwardly from the second end and defining a second opening in the receptacle, wherein the receptacle comprises telescoping portions; and a removable cover structured and arranged to selectively expose the second opening and selectively form a substantially water-tight seal in the second end.

16. A method of creating a sand sculpture comprising:

detaching a removable cover from a receptacle defining a sand sculpture shape, the receptacle tapering from a first end to a second end, the first end having a rim defining a first opening in the receptacle, the second end having an edge projecting inwardly from the second end and defining a second opening in the receptacle, the removable cover structured and arranged to selectively expose the second opening and selectively form a substantially water-tight seal in the second end;

placing the first end of the receptacle on a sand surface;

pouring sand through the second opening and into the receptacle;

tamping the sand so that the sand assumes the shape of the receptacle; and removing the receptacle.

17. The method of claim 16 further comprising detaching a second receptacle from the cover.

18. The method of claim 17 wherein sand is poured from the second receptacle into the second opening.

19. The method of claim 17 further comprising creating a second sand sculpture with the second receptacle.

20. The method of claim 16 further comprising reattaching the cover to the second end to form the substantially water-tight seal.

21. A sand sculpture mold comprising:

a hollow receptacle defining a sand sculpture shape, the receptacle tapering from a first end to a second end, the first end having a rim defining a first opening in the receptacle, the second end having an edge projecting inwardly from the second end and defining a second opening in the receptacle; and a removable cover structured and arranged to selectively expose the second opening and selectively form a substantially water-tight seal in the second end, wherein the cover is configured to attach to the second end of the receptacle from outside the receptacle.

22. The sand sculpture mold of claim 21, wherein the receptacle comprises one or more latches.

23. The sand sculpture mold of claim 6, wherein the receptacle comprises one or more latches.

24. The sand sculpture mold of claim 8, wherein the receptacle comprises one or more latches.

* * * * *